United States Patent [19]

Pierce

[11] Patent Number: 4,695,739
[45] Date of Patent: Sep. 22, 1987

[54] MULTI-FUNCTION SWITCH-CONTROLLED LAMP CIRCUIT

[76] Inventor: Lyle R. Pierce, P.O. Box 19387, Portland, Oreg. 97219

[21] Appl. No.: 788,924

[22] Filed: Oct. 18, 1985

[51] Int. Cl.$^4$ ...................... H01H 43/00; G05B 19/10
[52] U.S. Cl. ................................ 307/141; 307/132 R; 307/132 M; 307/134; 307/149
[58] Field of Search ............... 307/112, 139, 140, 141, 307/141.8, 157, 132 R, 125, 132 EA, 132 M, 134, 141.4, 149, 152; 323/905

[56] References Cited

U.S. PATENT DOCUMENTS

| | | | |
|---|---|---|---|
| 3,979,601 | 9/1976 | Franklin | 307/141 |
| 4,002,925 | 1/1977 | Monaham | 307/141 |
| 4,344,000 | 8/1982 | Schornack et al. | 307/132 E |
| 4,494,012 | 1/1985 | Coker | 307/132 E |
| 4,540,984 | 9/1985 | Waldman | 307/141 X |
| 4,570,216 | 2/1986 | Chan | 307/141 X |

FOREIGN PATENT DOCUMENTS 8501364  3/1985  PCT Int'l Appl. ............ 307/132 R Primary Examiner—William M. Shoop, Jr.
Assistant Examiner—Bentsu Ro
Attorney, Agent, or Firm—Chernoff, Vilhauer, McClung & Stenzel

[57] ABSTRACT

A multi-function circuit controller provides auxiliary control functions for an existing single-pole, single-throw toggle switch by counting the number of changes of state of the switch that occur within predesignated delay periods from one state change to the next. An encoder responsive to a sequencer counter develops control functions such as dimming and timing functions which attenuate the power delivered to the load and regulate the on-off time of the load. The invention may be used in conjunction with a household lighting circuit to provide these functions for an existing wall-mounted switch, thereby providing dimmer and programmable timing for the lighting normally controlled by the switch.

14 Claims, 5 Drawing Figures

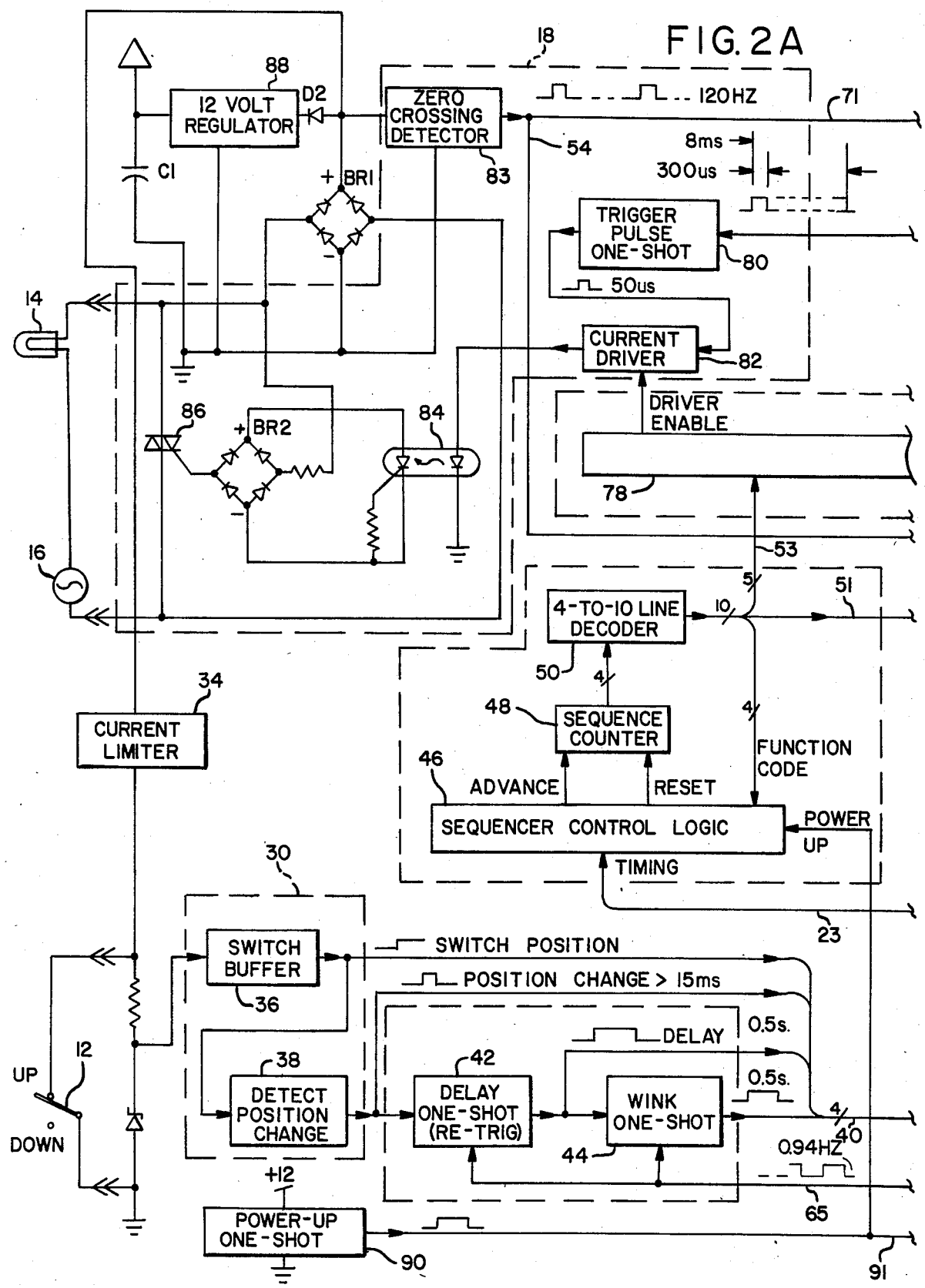

MULTI-FUNCTION SWITCH-CONTROLLED LAMP CIRCUIT

BACKGROUND OF THE INVENTION

The present invention relates to a multi-function controller for a circuit in which various control functions such as dimmer and timer functions are implemented by input codes corresponding to the number of sequential changes of state of a single-pole, single-throw switch.

Household lighting circuits employing ceiling- or wall-mounted lamps are usually controlled by wall switches which are single-pole, single-throw toggle switches. The only function that these switches provide is to turn the lamp on or off. Dimmers are available which, in addition, also include a dial which controls a variable resistor to provide an attenuation of the power delivered to the load, thus dimming the light.

Timing circuits for lights have also been available; however, these either require the use of a lamp which is to be plugged into a wall socket with the timer circuit placed between the lamp and the power source or, if implemented in a wall switch, require a new switch having a numerical indicator whose settings can be selectively controlled for providing the timing function. An example of this type of device is shown in Schornack, U.S. Pat. No. 4,344,000. Other wall-mounted controls may have a timing function which exists only for a fixed interval. An example of such a device is shown in Franklin, U.S. Pat. No. 3,979,601 in which a programming disc having notches cut at appropriate intervals, dictates the timing interval of the controlled circuit.

Yet another type of wall-mounted switch box uses a three-position toggle switch in which one of the toggle switch positions initiates a timing mode. An example is Coker, U.S. Pat. No. 4,494,012. However, the length of time controlled in the timing mode is fixed and cannot be reprogrammed. In Coker, in order to change the timing, the circuit must be disassembled and the timer IC must be replaced. Other toggle-switch-operated timers that can be programmed are available, an example being Monahan, U.S. Pat. No. 4,002,925. However, the Monahan device requires a mechanically complex five-position switch for turning the circuit on and off and for setting the timer functions.

What is needed, therefore, is a programmable timer and dimmer which can be included with the standard on/off functions of a single-pole, single-throw toggle switch and incorporated into a standard wall-mounted switch box.

SUMMARY OF THE INVENTION

The present invention provides multi-function switching capability for an existing single-pole, single-throw switch of a type commonly found in wall-mounted switch boxes. These functions include a programmable timing function and a dimming function. All functions are controlled from the single-pole, single-throw switch.

Various control modes are initiated from the single-pole, single-throw (SPST) switch by counting the number of transitions or changes of state of the switch which occur within preselected timeframes. As the switch sequentially changes state, a counter counts the number of state transitions. A particular control mode is uniquely associated with preselected numbers of sequential state transitions. In order to avoid the necessity of cycling through all possible control modes in order to arrive at a desired mode, a delay timer is initiated by each change of state of the switch. If the next change of state of the switch occurs after the delay interval the counter is reset. Thus the previous function will remain in effect and the next transition will start the counter from either the full-on mode or the full-off mode. Thus, the number of switch transitions or changes of state and the time interval between transitions dictate the particular functional mode of the switch.

The function controller requires no moving parts and is completely electronic. It may be directly connected to an existing SPST switch, such as a wall-mounted toggle switch, and is also connected in series with the "hot" lead of a standard AC lighting circuit, to which the switch is normally connected. Because the controller derives its operating power parasitically from the lamp circuit, access to the common lead of the AC power supply is not needed. The controller may therefore be installed in existing household circuits without the need for rewiring or for new and expensive mechanical switches, dials or levers.

Assuming that the switch is first in the off or down position, flipping the switch up will turn the light on, where it will remain on indefinitely. If the switch is toggled once again during the delay period, the controller goes into a sweep mode in which the amount of power supplied to the light slowly varies from minimum to maximum. This continuous sweep action will continue until the switch is toggled again, at which point the instantaneous value of the swept power will be locked into a memory and the lamp will be provided this power indefinitely. Since the wall-mounted toggle switch usually controls a lamp, this function will be perceived as a dimmer function. Thus, by locking in the desired brightness during the sweep mode the appropriate dimmer level for the light may be chosen.

The dimmer mode can be bypassed by quickly toggling the switch one more time to place the controller in a time-out mode. In this mode a timer is enabled which contains a timed interval instruction in memory. Depending on whether the switch is toggled again in this mode, the time-out function will either cause the light to go on or off at the expiration of the timed interval. If no timed interval has been programmed into this mode, the interval is automatically chosen to be a predetermined minimum interval, usually on the order of three minutes. Toggling the switch once more will place the function controller in a security time-out mode in which the circuit will change state every 12 hours from on to off or vice versa, depending upon whether the switch is toggled once or twice from the time-out mode. Toggling the switch again places the function controller in a timer programming mode. The timer programming mode operates in real time. When the timer programming mode is entered, the next transition of the switch, after the delay period has expired, will lock the intervening period of time into memory. This provides the timing interval when the aforementioned time-out mode is entered. Toggling the switch again returns to the beginning of the sequence, that is, to full-on or full-off.

Thus, the function controller is responsive to the number of changes of state of the toggle switch, each within a predetermined delay period for initiating various supplementary control functions for an existing SPST light switch. Advancing the function controller to the next mode requires that the switch be toggled within the delay period which may be arbitrarily set at some convenient value, for example, 0.5 second or 1 second. Default logic will return the function controller to either the full-on or full-off state on the next transition if the switch is not toggled from the previous mode within the delay period.

The function controller controls the brightness of the light and turns it on and off by means of a conventional phase angle triac firing circuit. This circuit includes a zero crossing detector for providing clock information to a timer control logic circuit. A brightness control circuit controls the firing angle of the triac and hence the brightness of the light. The brightness control circuit is in turn controlled by a sequence control circuit and the timer controlled circuit. The sequence control is responsive to changes of state of the toggle switch and includes a counter which provides a unique function code based upon the number of sequential changes of state of the SPST switch within the relevant delay periods.

The timer control circuit performs the timing functions for the function controller and provides commands to the brightness control circuit at appropriate intervals of time.

A delay network which is responsive to a switch position change detector provides a delay pulse which is, in turn, provided to the brightness control and as an enabling signal for the sequencer control. The delay network also includes a wink one shot pulse circuit for providing a visual confirmation to the user of the selection of a particular mode. The wink operates in the time-out mode, the security mode, and in the timer programming mode. It provides a momentary blink of the light either from off to on, or vice versa, depending upon the state, to signify the selection of one of these modes.

A principal object of this invention is to provide a function controller responsive to a SPST switch for providing various supplementary functions for an electrical circuit.

A further object of this invention is to provide a programmable timer and dimmer for an electric light circuit which may be controlled exclusively by an SPST switch.

Yet a further object of this invention is to provide programmed functions for an electrical circuit responsive only to the number of changes of state of an SPST switch.

A still further object of this invention is to provide a delay period after each change of state of an SPST switch-actuated function controller for reset of the controller.

The foregoing and other objectives, features and advantages of the present invention will be more readily understood upon consideration of the following detailed description of the invention taken in conjunction with the accompanying drawings.

BRIEF DESCRIPTION OF THE DRAWINGS

FIG. 2a is a first portion of a detailed block diagram of the circuit of FIG. 1.

DETAILED DESCRIPTION OF THE INVENTION

Figure 1:
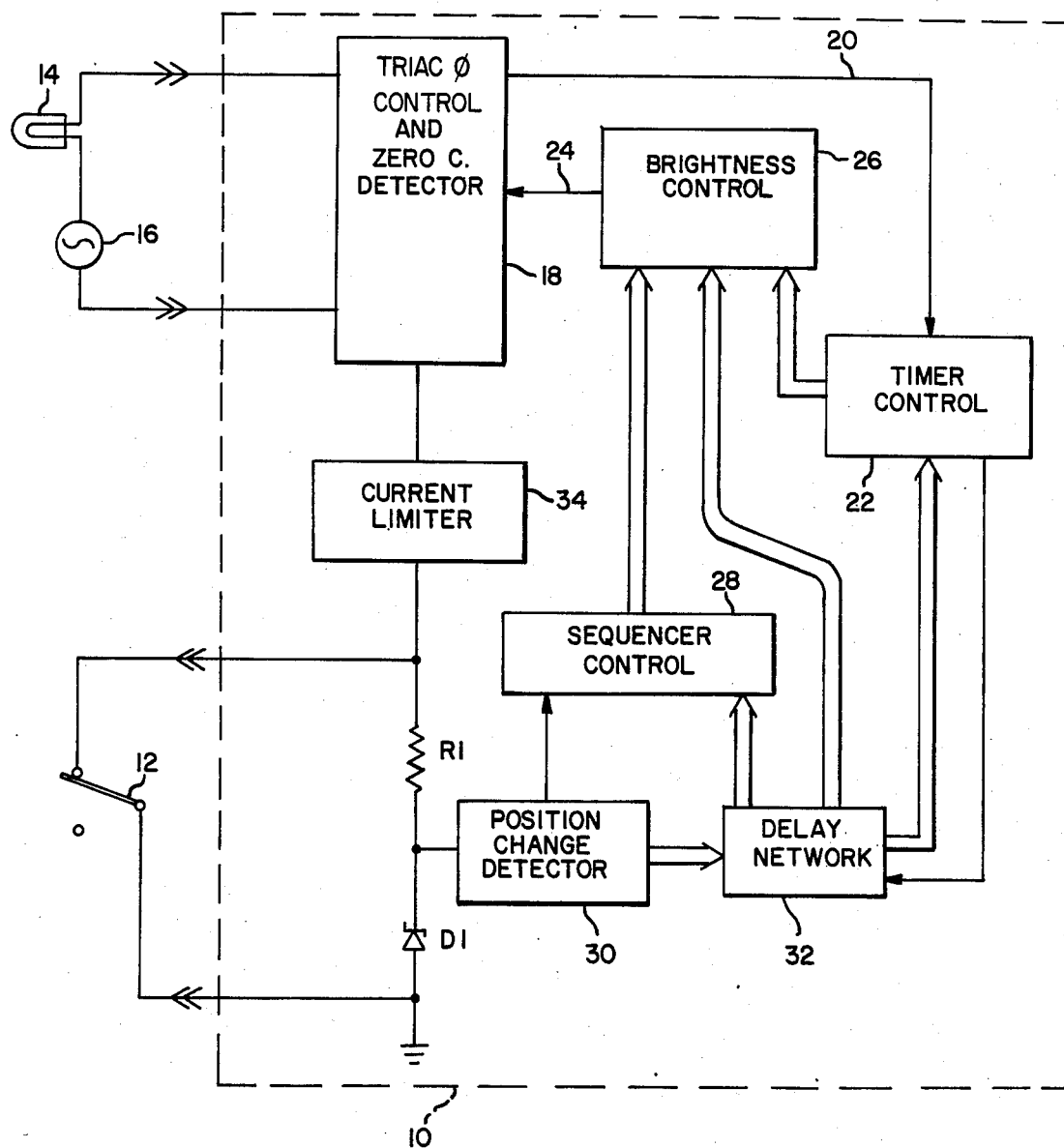
FIG. 1 is a simplified block diagram of a household lighting circuit employing the function controller of the present invention.

A function controller 10 is connected between a single-pole, single-throw (SPST) switch 12 and an incandescent lamp 14 in series with a 120-volt AC power source 16. The function controller 10 includes a triac phase angle control and zero crossing detector 18 which controls the amount of power from the AC power source 16 to be supplied to the lamp 14. This circuit also provides timing information on line 20 to timer control 22, which, in turn, provides signals to control the operation of lamp 14 at various timed or programmed intervals. The triac phase angle control and zero crossing detector 18 is controlled by an analog signal on line 24 from brightness control 26. The brightness control 26 is responsive to logic signals from the timer control and from a sequencer control 28. The sequencer control 28 receives commands from a position change detector 30 which detects a change of state of switch 12 and also from a delay network 32. Delay network 32 also provides logic information to the timer control 22 and the brightness control 26. A current limiter 34, together with resistor R1 and zener diode D1, provides an appropriate voltage level for the input to position change detector 30.

Figure 2B:
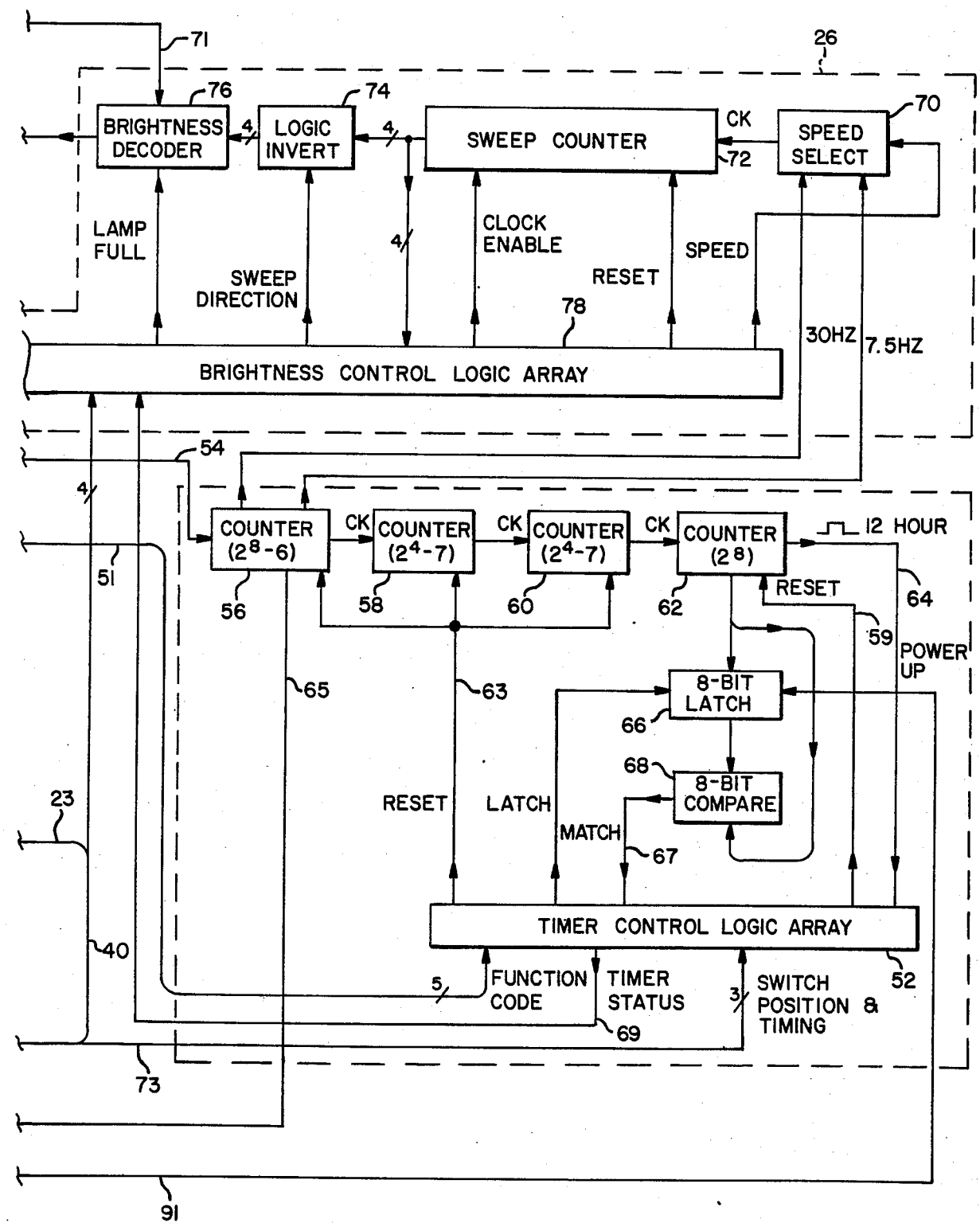
FIG. 2b is the second portion of a detailed block diagram of the circuit of FIG. 1.

The circuit of FIG. 1 is expanded and shown in more detail in the detailed block diagram of FIGS. 2a and 2b. Each time the switch 12 changes state, the position change detector 30 provides a pulse which indicates the position of the switch, high level for "on" and low level for "off." The position change detector 30 includes a switch buffer 36 and a detect position change circuit 38. The output of the switch buffer 36 is a switch position signal which is either high or low depending upon whether the switch is up or down. The detect position change circuit 38 provides a 15-millisecond position change pulse which is one line of a four-line bus 40 connected to brightness control 26. The detect position change circuit 38 also provides the same 15-millisecond pulse to a delay one-shot 42. The delay one-shot 42 in turn triggers wink one-shot 44. The outputs from both one-shots are provided to brightness control 26 via bus 40.

Each time the switch 12 changes state, timing and switch position information are provided to sequencer control 28 on line 23. The sequencer control 28 includes a sequencer control logic array 46 connected to a sequencer counter 48. A 4-to-10 line decoder 50 combines various combinations of the output of the sequencer counter 48 in order to provide control signals via bus 51 for the timer control logic array 52 which is part of timer control 22. The 4- to 10-line decoder 50 also provides a five-bit control line via bus 53 to the brightness control logic array 78 for turning the lamp 14 on and off or for operating the lamp in the dimmer mode. The sequencer counter 48 is a four-bit counter which is sequentially advanced each time switch 12 changes state within the period of delay one-shot 42. If the change of state occurs after the delay period, the sequencer counter 48 is usually reset unless the function controller is already in one of two other predesignated modes as will be explained below.

The timer control 22 receives an input clock pulse at the rate of 120 cycles per second over line 54 which is connected to triac phase angle control and zero crossing detector 18. This clock pulse input drives a plurality of counters 56, 58, 60 and 62 all connected in series. When one of the counters fills up, the next counter begins storing clock pulses. The counters 56, 58, 60 and 62 will count pulses from the line 54 until 12 hours have elapsed, at which time all counters will be filled up and a short pulse will be provided to the timer control logic array 52 over line 64. The logic array 52 also provides reset pulses on lines 59 and 63 to reset each of the counters in response to certain control functions as will be explained below. Counter 56 also provides a timing pulse which is a 0.94 CPS tap on line 65 connected to delay one-shot 42 and wink one-shot 44 for controlling the widths of the one-shot pulse output of each.

An eight-bit latch 66 is used to set timing intervals during the program timer mode. The programming is accomplished in real time so that when the switch 12 closes after the chosen elapsed time interval, the existing pulse count is latched in latch 66. When the time-out mode is entered, the count at the output of counter 62 is continuously compared to the latched value in latch 66 by an eight-bit comparator 68. When both counts match, a match signal on line 67 is provided to the timer control logic array 52.

The timer control logic array 52 provides a timer status signal to brightness control 26 on timer status line 69 depending upon the inputs to array 52, such as the function code line 51 and the switch position and timing line 73. The brightness control 26 includes a speed select circuit 70 which controls sweep counter 72. The sweep counter is in turn connected to logic inverter 74 which in turn is connected to brightness decoder 76. A brightness control logic array 78 provides various control signals for these circuits. A speed signal for the speed select circuit 70 is provided to control the rate at which the lamp 14 makes a transition from dark to bright. This transition rate is chosen to be slow enough to greatly reduce filament shock in lamp 14, which would occur if full power were applied instantly to the lamp. Accordingly, in all but the dimmer sweep mode, the 30 CPS line from counter 56 is chosen to give a dark-to-bright sweep period of about 0.5 second. In the dimmer sweep mode, the lamp 14 cycles from its minimum to its maximum and back to its minimum value continuously, but at a more gradual rate so that the user may select the desired degree of brightness. Thus, in this mode the 7.5 CPS line from counter 56 is selected. The speed select circuit 70 drives the sweep counter 72 at its clock input which, in turn, provides a digital signal representing a selected degree of brightness. In the dimmer sweep mode the sweep counter continuously increments to its full value and resets. The logic inverter 74 changes state in this mode each time the sweep counter 72 arrives at its maximum count. The four-bit digital output of the logic inverter is provided to a brightness decoder 76 which, in turn, provides an analog signal to control the triac phase angle control and zero crossing detector 18.

The triac phase angle control and zero crossing detector 18 includes a trigger pulse one-shot 80 which provides a 50-microsecond pulse to a current driver 82. The timing of the trigger pulse one-shot 80 is determined by the analog output of brightness decoder 76.

The current driver 82 provides a pulse to drive the LED portion of an opto-isolator 84. The output of the opto-isolator 84 is coupled to diode bridge BR2 which has an output line gating a thyristor 86.

A power supply includes a 12-volt regulator 88, a full wave rectifier bridge BR1, diode D2, and storage capacitor C1. Zero crossing detector 83 is connected to bridge BR1 and provides 120 CPS output to counter 56 and also to input brightness decoder 76, the latter on line 71 for synchronization of thyristor firing with AC line frequency.

Figure 4:
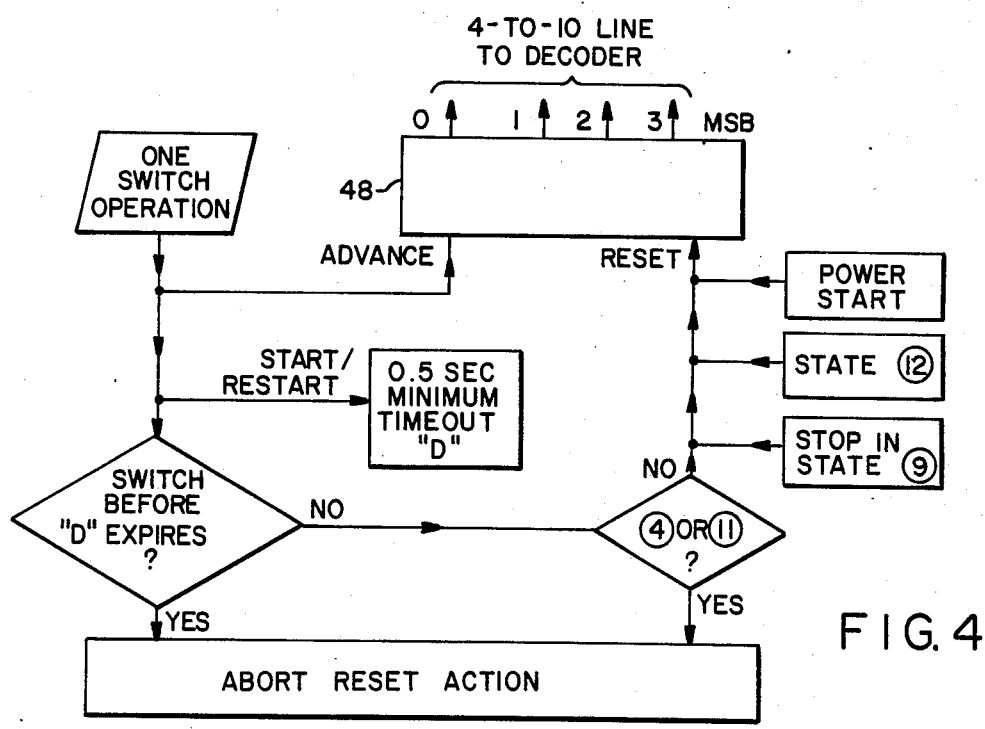
FIG. 4 is a flow chart diagram illustrating the way in which the toggle switch increments a sequencer counter which is part of the sequencer control in FIG. 1.

FIG. 4 shows a flow chart diagram illustrating how a coded signal from sequence counter 48 is developed for each change of state of switch 12. One switch operation increments sequencer counter 48 and initiates a half-second time-out by triggering delay one-shot 42. If the next change of state of the switch occurs within the half-second delay period a reset action is aborted and the 0.5 second timeout is reinitiated. If the change of state occurs after the half-second delay period, it is next necessary to determine if the sequencer control 28 is in state number 4 or state number 11. If it is in either of those states the reset action is also aborted. If it is in any other state besides 4 or 11, however, the counter 48 is reset. The counter 48 is also reset by powering up from a no-voltage condition. This reset pulse is provided by power-up one-shot 90. The same pulse resets latch 66 via line 91. (Refer to FIG. 2). State 12 and a stop in state number 9 will also cause sequence counter 48 to reset. Thus, sequence counter 48 advances incrementally each time switch 12 changes state except when the change of state occurs more than one-half second subsequent to the last change of state. In such a case, the sequence counter is reset unless the present state is state 4 or 11.

Figure 3:
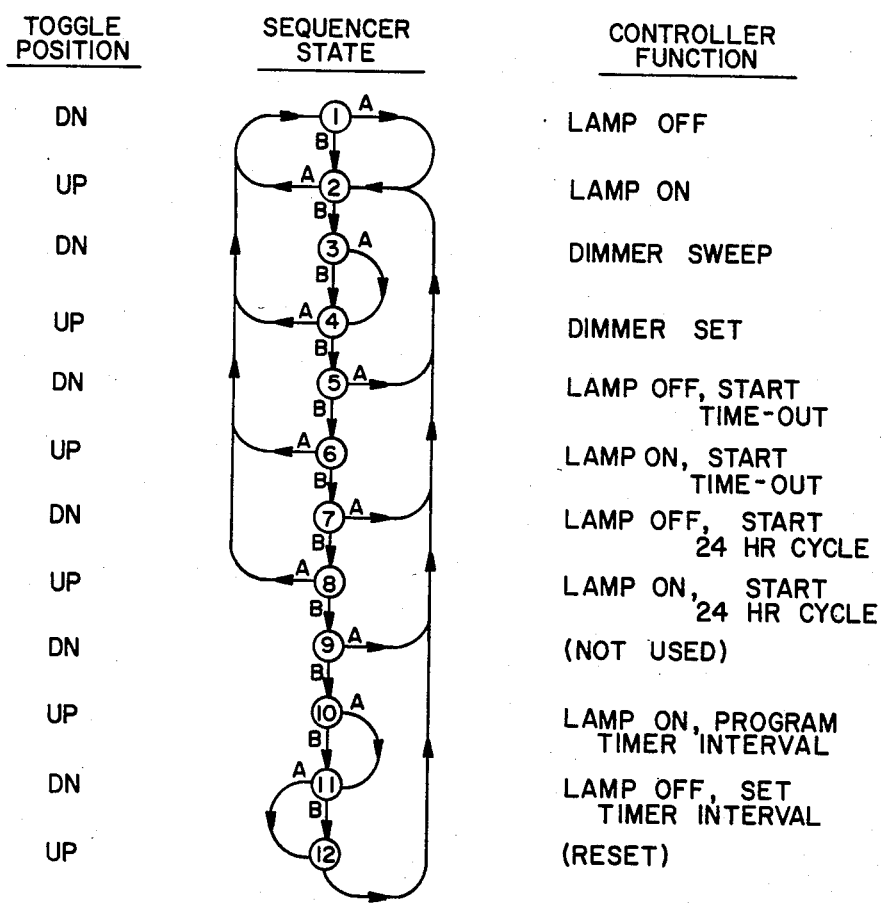
FIG. 3 is a sequencer state diagram illustrating how the various modes of the function controller of FIG. 1 are entered.

A state flow diagram is shown in FIG. 3 which illustrates the method of operation of the function controller 10. The "A" path indicates the transition if the toggle occurs after the half-second delay time-out. Path "B" indicates the transition if the toggle occurs before the half-second delay time-out. If the switch is initially in a down position, and the sequencer has settled in state 1 for more than 0.5 second, the lamp will be off. Toggling the switch once, either within the delay period or outside of the delay period, will initiate sequencer state 2, but the lamp will remain off until 0.5 second delay has expired. If the switch is moved while less than half a second has elapsed since the previous toggle, sequencer state 3, the dimmer sweep mode, is entered. On the other hand, if the transition out of sequencer state 2 occurs more than one-half second after entering sequencer state 2, sequencer state 1 is re-entered and the lamp is turned off. In sequencer state 3 the controller goes into a dimmer sweep cycle in which a digital code from sweep counter 72 is inverted once every half cycle by logic inverter 74. This provides the signal to brightness decoder 76 that causes the lamp 14 to alternately fade from dark to bright and back to dark again. If at any time during this sweep cycle the switch is toggled again, sequencer state 4 will be entered. The length of time that has elapsed between the entry of state 3 and the entry of state 4 is irrelevant since, as shown in FIG. 4, reset is aborted whenever sequencer state 4 is entered. In state 4 the existing brightness level is locked into brightness control logic array 78 and the lamp is maintained at that level of brightness indefinitely. If the dimmer mode is bypassed by rapidly advancing to sequencer state 5, the lamp will be turned off and time-out mode will be initiated. In the time-out mode a pre-programmed time interval will elapse before the lamp comes back on where it remains on indefinitely. This time interval is set in the program timer interval mode at sequencer states 10 and 11. The same result can be obtained (with the lamp on) by rapidly advancing to sequencer state 6. If sequencer state 6 is also bypassed, and the switch is toggled for the seventh time or the eighth time, a security mode is entered in which the lamp will either turn on or off after 12 hours, depending upon whether sequencer state 7 or sequencer state 8 is entered. This sequence will repeat at 24-hour intervals. State 9 is provided to logically isolate control functions from programming functions, thereby giving some degree of protection against accidently switching to a programming function. The tenth toggle of switch 12 places the function controller 10 in a programming mode. In sequencer state 10 the lamp is on and will remain on until the switch 12 is toggled again, thus selecting controller state 11. In state 11, the eight-bit latch 66 will latch the present value of the counter 62. This corresponds to a timer interval. If at any time after this, sequencer state 6 is entered, the lamp will remain on until the programmed period of time has elapsed. When the value of counter 62 matches the counter value in eight-bit latch 66 as determined by eight-bit comparator 68, a match signal will be provided to the timer control logic 52 which will in turn provide a signal to the brightness control logic array 78 to turn the lamp 14 off. The converse occurs in using sequencer state 5. Sequencer state 12 performs only a reset function.

To provide visual feedback to a user in states 5, 6, 7, 8, 10, and 11, the light will wink briefly from off to on or vice versa depending upon the position of the switch. This wink is initiated by wink one-shot 44 and provides visible confirmation that one of the aforementioned states have been entered.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. In an electrical circuit including a power source, a load and a single-pole, single-throw switch for normally controlling the application of power to the load, a function controller connected in series with said load and also connected to said switch, said function controller being actuated by a predetermined number of changes of state of said switch to provide auxiliary functions for said electrical circuit wherein each auxiliary function is implemented as a result of the number of times said switch changes state.

2. The function controller of claim 1 wherein said load is a light and said power supply is an AC power source.

3. The function controller of claim 2 wherein one of said functions includes selectively attenuating the amount of power supplied to said load.

4. The function controller of claim 2 including timing control means for selectively establishing a period of duration during which power will be supplied to said load.

5. The function controller of claim 3 wherein said power is selectively attenuated by brightness control means for cycling said load from its most attenuated state to its least attenuated state and further including means responsive to a change of state of said switch while a cycle is in progress for choosing an instantaneous state of attenuation of said power.

6. The function controller of claim 4 wherein said timing means is responsive to a change of state of said switch for establishing said period of duration when said change of state occurs after an interval of time corresponding to said period of duration.

7. The function controller of claim 2 wherein said switch is a wall-mounted light switch.

8. In an electrical circuit including a power source, a load and a single-pole, single-throw switch for normally controlling the application of power to the load, a function controller comprising:
   (a) delay timer means responsive to each change of state of said switch for providing a timing signal of predetermined duration, said timing signal being initiated each time said switch changes state; and
   (b) encoder means responsive to each change of state of said switch and to a delay signal from said delay timer means for providing a circuit function control signal.

9. The function controller of claim 8 wherein a first coded signal is provided if the single-pole, single-throw switch changes state within the predetermined duration of said timing signal and a second coded signal is provided if the switch changes state after the predetermined duration of said timing signal.

10. The function controller of claim 9, further including brightness control means for selectively regulating the power available to said load upon the occurrence of a predetermined coded signal.

11. The function controller of claim 9 further including timer logic control means for controlling the times when power is supplied to said load.

12. Apparatus for providing supplemental functions for an existing switch such as variably reduced power or timed control for an electrical circuit wherein said existing switch is a single-throw, single-pole switch comprising:
   (a) a timer circuit actuated by at least a first change of state of said existing switch to provide a delay period;
   (b) counter means for counting the number of times said existing switch changes state, each within said delay period from the previous change of state; and
   (c) control means responsive to said counter means for initiating one of said supplemental functions depending upon the number of changes of state that occur.

13. The apparatus of claim 12 including reset means for resetting said counter means upon a subsequent change of state of said existing switch from a previous change of state if said change of state occurs outside said delay period.

14. The apparatus of claim 13, including override means for aborting the reset of said counter means during predesignated control modes initiated by said control means.

* * * * *

UNITED STATES PATENT AND TRADEMARK OFFICE
CERTIFICATE OF CORRECTION

PATENT NO. : 4,695,739

DATED : Sept. 22, 1987

INVENTOR(S) : Lyle R. Pierce

It is certified that error appears in the above-identified patent and that said Letters Patent is hereby corrected as shown below:

Col. 8, line 11    After "timing" insert --control--

Signed and Sealed this

Thirty-first Day of May, 1988

Attest:

DONALD J. QUIGG

Attesting Officer

Commissioner of Patents and Trademarks